United States Patent
Maaref et al.

(10) Patent No.: US 11,310,776 B2
(45) Date of Patent: Apr. 19, 2022

(54) SENSING AND RESOURCE SELECTION FOR SIDELINK GRANT-FREE TRANSMISSIONS

(71) Applicant: Huawei Technologies Co., Ltd., Shenzhen (CN)

(72) Inventors: Amine Maaref, Ottawa (CA); Yu Cao, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/930,671

(22) Filed: May 13, 2020

(65) Prior Publication Data

US 2020/0367221 A1    Nov. 19, 2020

Related U.S. Application Data

(60) Provisional application No. 62/847,091, filed on May 13, 2019.

(51) Int. Cl.
| | | |
|---|---|---|
| *H04W 72/04* | (2009.01) | |
| *H04W 24/08* | (2009.01) | |
| *H04W 72/08* | (2009.01) | |
| *H04W 92/18* | (2009.01) | |
| *H04W 4/40* | (2018.01) | |

(52) U.S. Cl.
CPC ....... *H04W 72/0406* (2013.01); *H04W 24/08* (2013.01); *H04W 72/0486* (2013.01); *H04W 72/085* (2013.01); *H04W 4/40* (2018.02); *H04W 92/18* (2013.01)

(58) Field of Classification Search
CPC .. H04L 41/145; H04L 43/00; H04W 4/40–48; H04W 8/20; H04W 16/18; H04W 24/08; H04W 36/0072; H04W 72/0406–0433; H04W 72/0486; H04W 72/085; H04W 92/18

See application file for complete search history.

(56) References Cited

U.S. PATENT DOCUMENTS

| | | | |
|---|---|---|---|
| 11,026,120 B2 * | 6/2021 | Khoryaev | H04W 72/0486 |
| 2008/0126347 A1 * | 5/2008 | Mori | G06F 16/2465 |
| 2019/0387377 A1 * | 12/2019 | Zhang | H04W 52/281 |

OTHER PUBLICATIONS

Toghi, B. et al. "Multiple Access in Cellular V2X: Performance Analysis in Highly Congested Vehicular Networks" IEEE Vehicular Networking Conference 2018.

* cited by examiner

*Primary Examiner* — Thomas R Cairns
(74) *Attorney, Agent, or Firm* — Slater Matsil, LLP (57) ABSTRACT

Resource usage information is determined at a first UE about usage of a first communication resource by other UEs based on signals received by the UE. The first communication resource is excluded from a set of candidate communication resources when the resource usage information exceeds a usage threshold. When the first communication resource is excluded, a second communication resource from the candidate communication resources remaining in the set is selected to use for a transmission by the UE.

18 Claims, 6 Drawing Sheets

SENSING AND RESOURCE SELECTION FOR SIDELINK GRANT-FREE TRANSMISSIONS

RELATED APPLICATIONS

This Application claims the benefit of and priority to U.S. Provisional Patent application No. 62/847,091 filed May 13, 2019, entitled "SENSING AND RESOURCE SELECTION FOR SIDELINK GRANT-FREE TRANSMISSIONS", the content of which is incorporated herein by reference.

FIELD

The Application relates to methods and apparatus for sidelink transmission and resource allocation.

BACKGROUND

Vehicle to everything (V2X) refers to a category of communications scenarios that can include, among other things, communication between a vehicle and another vehicle (V2V), vehicle to infrastructure (V2I), vehicle to pedestrian (V2P), vehicle to network (V2N) and other scenarios. In V2X, the transmission can be done through a link between a network and a user equipment device (UE), such as uplink (UL) and downlink (DL), or through a sidelink between UE and UE (SL). UE cooperation can be used to enhance the reliability, throughput, and capacity of V2X communications, as well as next generation wireless communications in general.

Current Long Term Evolution (LTE) standards define an LTE V2X transmission scheme that relies on the concept of a transmit and receive resource pool (RP). A resource pool includes a set of time-frequency resources which can be contiguous or non-contiguous in time and or frequency. The resource pool may consist of sub-channels where a sub-channel consists of a group of contiguous RBs in a same subframe. The current LTE V2X transmission scheme includes two transmission modes: mode 3 and mode 4. In mode 3, a base station (BS) schedules time-frequency resources (from the UEs resource pool) for SL transmission using downlink control information (DCI), either dynamically or semi-persistently. In mode 4, a UE randomly selects resources within its transmit RP. A UE may also reselect resources based on previous measurement and sensing results.

The conventional resource pool approach specified by the current LTE V2X transmission scheme has downsides and limitations. For example, the scheduling in mode 3 results in scheduling-related limitations, such as latency and having the SL transmission rely on DCI. Furthermore, the design of LTE mode 4 relies on sensing and reservation to avoid collisions or resource conflicts between autonomous UE transmissions and therefore does not efficiently exploit radio resources. Additionally, LTE mode 4 is mainly targeted to handle periodic traffic and may be suboptimal for aperiodic traffic. New V2X schemes are being developed. For example, the $3^{rd}$ Generation Partnership Project (3GPP) is now working on Release 16 New Radio (NR) V2X standardization. NR V2X contemplates two SL transmission modes. In mode 1, the BS controls SL transmission. In mode 2, the UE determines or selects a resource among a resource pool. NR Release 16 is expected to include an agreement for a Mode 2 grant free transmission scheme that includes a sensing procedure performed at a UE that may use sidelink control information (SCI) decoded from other UEs, and/or sidelink measurements. However, many of the specifics of the Mode 2 sensing procedure are currently undefined (i.e. designated for further study (FFS)), including: information to be extracted from SCI decoding; sidelink measurements that are to be used; UE behavior and timescale of the sensing; and whether sidelink control feedback information (SFCI) is to be used in sensing procedure. New Radio (NR) Release 16 also includes agreement for a resource (re)-selection procedure that uses results of sensing procedure to determine resource(s) for sidelink transmission. Many of the specifics of the resource (re)-selection procedure are also designated FFS, including: timescale and conditions for resource selection or re-selection; resource selection/re-selection details for physical sidelink control channel (PSCCH) and physical sidelink shared channel (PSSCH) transmissions; details for physical sidelink feedback channel (PSFCH) (e.g. whether resource (re)-selection procedure based on sensing is used or there is a dependency/association b/w PSCCH/PSSCH and PSFCH resource); and the impact of sidelink QoS attributes on resource selection/re-selection procedure.

NR's mode 1 UL grant-free transmission is called "configured grant UL transmission" or "UL transmission without dynamic scheduling." It includes two types. For configured grant Type 1, a resource is configured by radio resource control (RRC) signaling. For configured grant Type 2, a resource is configured by a combination of RRC signaling and DCI signaling. NR UL Configured grant type 1 transmission is mainly used for uplink transmission, which means the base station that configured the resource is also the receiver. Therefore, the BS (e.g. the receiver) knows all the configuration parameters of the configured grant UE.

However, in the case of SL, both the transmitter and receiver are UEs, therefore, the receiver UE is not be able to know the transmitter UEs properties. For example, the receiver UE is unaware of which UE is transmitting and to whom transmissions are directed, the time/frequency resource used for the transmission, and the control information for the transmitter UE. Such information may need to be blindly detected by the receiver UE, or alternatively the receiver UE may need to be configured by the transmitter UE via PC5 Radio Resource Control (RRC) or, if the receiver UE is within network coverage, by the gNB node.

In some V2X SL examples, a sidelink control channel can be used to enable a scheduling assignment (SA) associated with each sidelink data transmission. In such examples the receiver UE decodes the sidelink control channel signals first to obtain information before decoding the data, and thus the SL grant-free mode requires configuration of SL control information.

In addition, NR's configured grant transmission mode does not configure a repetition pattern; rather, only the repetition number can be configured. The repetition, if configured, is performed at the slot immediately following initial transmission.

Accordingly, methods and systems for sensing and resource selection appropriate for sidelink grant-free transmissions are desired.

SUMMARY

According to a first example aspect is a method that includes:

determining, at a first user equipment device (UE), resource usage information about usage of a first communication resource by other UEs based on signals received by the UE; excluding the first communication resource from a set of candidate communication resources when the resource usage information exceeds a usage threshold; and selecting, by the first UE, when the first communication resource is excluded, a second communication resource from the candidate communication resources remaining in the set to use for a transmission by the UE.

According to some examples of the first aspect, determining the resource usage information comprises determining a number of other UEs using the first communication resource, and the usage threshold is based on the number of other UEs exceeding a threshold number of other UEs.

According to some examples of the first aspect, the first communication resource corresponds to a communication channel, and determining the resource usage information further comprises measuring received signal power for the communication channel, and the usage threshold is also based the measured received signal power exceeding a threshold received signal power, wherein the first communication resource is excluded from the set of candidate communication resources when the number of other UEs using the first communication resource exceeds the threshold number of other UEs and the measured received signal power exceeds the threshold received signal power.

According to some examples of the first aspect, the received signal power is measured in respect of a plurality of reference signals transmitted by other UEs. In some examples, the communication channel is a physical sidelink shared channel (PSSCH), and the reference signals are demodulation reference signals (DMRS).

According to some examples of the first aspect, determining the number of other UEs using the first communication resource comprises
determining a number of control signals, received by the UE over a control channel, from other UEs that indicate the communication resource.

According to some examples of the first aspect, the control channel is a physical sidelink control channel (PSCCH) and the control signals are sidelink control information (SCI).

According to some examples of the first aspect, determining the number of other UEs using the first communication resource comprises determining a number of reference signals, received by the UE over a data channel, from other UEs that indicate the first communication resource.

According to some examples of the first aspect, the data channel is a physical sidelink shared channel (PSSCH), the first and second communication resources define respective resources for the PSSCH, and the reference signals are demodulation reference signals (DMRSs).

According to a second example aspect is a user equipment device (UE) that is configured to perform one or more of the methods of the first aspect.

According to one aspect of the present disclosure, there is provided a method for communication between UEs comprising determining availability of a communication resource based on a number of UEs that are currently using the communication resource.

According to another aspect is a method for sidelink communication between UEs, comprising sensing a sidelink channel to determine a number of UEs using a sidelink transmission resource and, based the number of UEs using the sidelink transmission resource, determining if the sidelink transmission resource should be excluded from use by a transmitting UE.

According to another aspect of the present disclosure, there is provided a user equipment comprising a processor and memory and at least one antenna, the UE configured to perform the method as described herein.

BRIEF DESCRIPTION OF THE DRAWINGS

Embodiments of the disclosure will now be described with reference to the attached drawings in which.

DETAILED DESCRIPTION

Example embodiments are described that apply generally to any communication system where user equipment devices (UEs) reserve resources for sidelink (SL) communications based on resource availability.

When selecting SL transmission resources, existing V2X SL schemes such as LTE V2X may fail to sufficiently rely on advanced reception techniques, such as interference cancellation that can resolve a number of collisions within a transmission resource, which can result in under-utilization of transmission resources. Advanced reception techniques can enable a greater number of UEs to share an SL transmission resource. Accordingly, example embodiments are described wherein the availability of a communication resource for use by a UE is determined based on the number of UEs already using that communication resource. This may, in some V2X SL grant-free (GF) scenarios, enable an optimized number of multiple UEs to share an SL transmission resource for GF transmissions. In example embodiments, transmission resource refers to a communication resource that includes at least time and frequency resources (e.g. a time duration and frequency bandwidth), although in some examples transmission resources could include other types of resources in code or space domains.

Accordingly, example embodiments are directed towards V2X SL methods and systems in which a transmitting UE considers the number of other UEs that are using a candidate resource when determining if that candidate resource is available for use by the transmitting UE. In example embodiments, the transmitting UE determines the number of other UEs using a candidate resource by performing a sensing procedure in respect of the candidate resource. A candidate resource is excluded from further consideration when a predefined maximum threshold number of UEs are determined to already be using that candidate resource. In some example embodiments, the sensing procedure can be based on sidelink control information (SCI), and in some example embodiments the sensing procedure can be based on SL channel measurements such as reference signal received power (RSRP) measurements performed in respect of signals such as demodulation reference signals (DMRS) received over a channel such as a physical sidelink shared channel (PSSCH). In some examples, the sensing procedure could be based on RSRP measurements preformed in respect of signal received over a physical sidelink control channel (PSCCH), or received signal strength indicator (RSSI) measurements in respect of signals.

First Example Embodiment

In a first example embodiment, the number of UEs using a candidate resource is determined based on SCI. In this regard, an example embodiment may be built on aspects of the LTE V2X mode 4 SL sensing, reservation and resource selection procedure that is described in document D1: "Multiple Access in Cellular V2X: Performance Analysis in Highly Congested Vehicular Networks", Behrad Toghi, Md Saifuddin, Hossein Nourkhiz Mahjoub, M. O. Mughal, Yaser P. Fallah, Jayanthi Rao, Sushanta Das; 2018 IEEE Vehicular Networking Conference (VNC 2018) (the contents of this document D1 are incorporated herein by reference).

Although example embodiments can be applied in different V2X SL environments, the presently described example is described in the context of the LTE sensing and resource allocation procedures. By way of context, as specified in the 3GPP Technical Specification (TS) 36.213 and TS 36.211, a given LTE physical channel is divided into fragments, both in time and frequency, which are referred to as frames. Every LTE frame is 10 ms long with a bandwidth equal to the system bandwidth. Each frame is further divided into 10 subframes in the time domain, i.e. each subframe is 1 ms wide and contains two time-slots. A time-slot (slot) is a time-series of N orthogonal frequency-division multiplexing (OFDM) symbols (assuming normal cyclic prefix length). Analogous segmentation is conducted for the frequency domain of the LTE frame; the LTE frequency resource comprises subcarriers, with 15 kHz subcarrier spacing. A 2-dimensional time-frequency entity can be considered as a radio resource in the orthogonal frequency-division multiple access (OFDMA) context. A resource element (RE) covers one symbol in time and 1 subcarrier in frequency domain. A resource block (RB) consists of 12 subcarriers in frequency and 1 slot, i.e., 7 symbols, in the time domain. Two consecutive RBs, in the time domain, form a scheduling block (SB).

UEs each broadcast messages, including for example basic safety messages (BSMs), as data blocks via the physical sidelink shared channel (PSSCH) and utilize the same communication channel to receive the data blocks. In this disclosure, data transmissions are referred to as transport blocks (TBs). A TB is transmitted in contiguous RBs. The number of RBs required to transmit a TB is a function of the data packet size, modulation order, and code rate. In addition, every TB is accompanied by corresponding sidelink control information (SCI), broadcast in the physical sidelink control channel (PSCCH). In some example embodiments, SCI contains information required for successful reception and demodulation of its corresponding TB and occupies two contiguous RBs per time-slot. A UE may transmit a TB and its corresponding SCI in the same subframe/slot. However, a TB and its corresponding SCI can be either adjacent or non-adjacent in time and/or frequency.

LTE V2X specifies a physical (PHY) layer and a higher medium access control (MAC) layer. In the PHY layer, every subframe breaks into $N_{subcH}$ smaller partitions, known as sub-channels. Each sub-channel consists of $N_{subcHsize}$ consecutive physical resource blocks (PRBs). The set of all available sub-channels is known as the PSSCH resource pool. A UE also defines a set of resources for SCI transmissions, referred to as the PSCCH resource pool. Each PSCCH resource may include a defined number of contiguous PRBs.

Two contrasting schemes are defined by 3GPP for PSSCH and PSCCH resource pool configuration: (i) TB and SCI must be placed in an adjacent fashion; (ii) Non-adjacent and separated resources can be allocated for TB and SCI.

In LTE V2X mode-4 SL, transmission resources are allocated autonomously and in a stand-alone fashion. LTE V2X mode-4 employs an enhanced resource allocation procedure known as sensing-and-reservation based scheduling (SRBS). Autonomous resource allocation is ultimately performed using a random process. However, SRBS shrinks the available resources and thus significantly decreases the collision probability by limiting every UE to select resources from a narrowed-down candidate resource set. The SRBS mechanism relies on two main concepts: first, it reduces the probability of the case that multiple UEs select a common resource; and second, stochastically decouples UEs by adding randomness to the resource allocation process.

The SRBS procedure can be divided into three processes: sensing, reservation, and transmission. During the sensing process, every UE listens to the PHY layer communication channel and keeps the track of all received signals from its neighboring UEs; this record is then utilized to reduce the size of a set or pool of candidate resources that is to be reported to the MAC layer. During the reservation process, the MAC layer reserves radio resources from the reduced size set of candidate resources. During the transmission process, the PHY layer assigns the selected physical resources to the data and control information.

In example embodiments, the reservation and transmission processes performed during the SRBS procedure are identical or similar to those described in document D1. However, in example embodiments the sensing process described in document D1 is modified as described below to take into account the number of UEs using a particular resource when determining if that resource should be included or excluded from the candidate resource set.

At the PHY layer, the smallest resource entity that can be allocated is one RB pair. However, higher layers (e.g. the MAC layer) can consider sets of sub-channels as the smallest allocable resources. In other words, if a higher layer requests sub-channels for transmission in the subframe, a candidate single-subframe resource (CSR), $R_{x,y}$, is defined as the set $\{x\text{-}j|j=0,1,\ldots L_{subcH}\text{-}1\}$, which consists of $L_{subcH}$ consecutive sub-channels in the subframe number y. In example embodiments, the SCI transmitted by a UE indicates or otherwise points to the CSR(s) used for an associated TB that corresponds to the SCI.

In example embodiments, a UE MAC layer processing unit can request a sensing report from a UE PHY layer processing unit at a subframe number n. Following this request, the PHY layer processing unit extracts the sensing window from its channel record buffer. The sensing window is defined as the set of all CSRs in the $[n-1, n-10 \times P_{sted}]$ timespan ($P_{step}$ is include to avoid synchronization conflicts, and may for example be set to 100 ms). Accordingly, in example embodiments, the PHY layer processing unit keeps track of all CSRs within a sensing window that covers the previous 1 s.

In example embodiments, a report window is defined as the set of all CSRs between the time frame $[n+T_1, n+T_2]$. The time offset $T_1$ can be set to any value less than or equal to 4 subframes and is preset by the higher layer depending on the required process time of the UE. The maximum allowed latency, $20 \leq T_2 \leq 100$, is also preset based on the application, e.g., in the vehicular community there is currently a consensus on $T_2=100$ ms for the safety applications.

In example embodiments, the CSRs within the report window form a set of candidate resource set $S_A$. As part of the sensing process, the PHY layer processing unit conducts an exemption procedure in order to remove CSRs with the higher likelihood of causing collisions from the candidate resource set $S_A$. The narrowed down set is then reported to the MAC layer processing unit to initiate the reservation process.

In this regard, the PHY layer processing unit initializes the candidate resource set $S_A$ with all available CSRs in the report window and enforces an exemption procedure in order to remove the likely-to-collide CSRs from the candidate resource set $S_A$. In example embodiments, any CSRs $R_{x,y}$ that meet any one of a plurality of exclusion conditions are excluded from the candidate resource set $S_A$.

In an example embodiment, a candidate CSR is removed from the candidate threshold set $S_A$ based on an exclusion condition that is triggered when two pre-defined thresholds are reached. The first threshold test is based on an RSRP threshold as follows: (i) the UE monitors SCI transmissions (for example on a PSCCH) and their corresponding TB transmissions (for example on a PSSCH); (ii) when an SCI message and corresponding TB fall in the subframe w in the sensing window, the reference signal received power (RSRP) of the TB is measured; and (iii) a determination is made if the RSRP meets or exceeds a pre-defined t RSRP threshold value $Th_{SBRS}$ (e.g. if sensed PSSCH-RSRP≥$Th_{SBRS}$ then the RSRP threshold has been reached in respect of the CSR). The second threshold test is based on the number of other UEs that are using the candidate CSR as follows: (i) the UE decodes all the SCIs associated with the candidate SCR (for example, all SCI's that point to the candidate CSR within the sensing window) to determine if the number $N_{other}$ of other UEs using the candidate CSR; and (ii) a determination is made if the number $N_{other}$ of other UEs using the candidate CSR meets or exceeds reaches a pre-defined threshold number of UEs L (e.g. if $N_{other}$≥L) then the number of other UEs threshold has been met). Under this two-part exclusion condition, the candidate CSR is removed from the candidate resource set $S_A$ if: $N_{other}$≥L AND PSSCH-RSRP≥$Th_{SBRS}$. Accordingly, under this exclusion condition, a candidate resource CSR is not excluded simply because another UE is using that resource; rather the candidate resource CSR is only excluded from candidate resource set $S_A$ if a threshold number of UEs (greater than 1) are using the resource AND the RSRP for the resource is at a threshold.

Additional exclusion conditions may also be applied in example embodiments. For example, as noted in document D1, a further exclusion condition can be that a CSR will be removed from the candidate resource set $S_A$ if the CSR is within a subframe z in the sensing window that has not been monitored and the reservation horizon of subframe z overlaps with that of subframe y.

In example embodiments, after the exemption procedure, the PHY layer processing unit checks if the resulting candidate resource set $S_A$ contains at least a predefine percentage (for example 20%) of the initial candidate CSRs; if not, the exemption procedure is repeated with step increases (e.g. 3 dB) in $Th_{SPS}$ until the narrowed down candidate resource set $S_A$ maintains or exceeds the percentage requirement.

In example embodiments, the remaining candidate SCRs in the candidate resource set $S_A$ may be ranked according to one or more criteria, for example based on a linear average of a sidelink received signal strength indicator (S-RSSI), with additional filtering applied based on such ranking to generate a further candidate resource set $S_B$. The PHY layer processing unit may then report the candidate resource set $S_B$ to the MAC layer, to be used during the reservation process.

Second Example Embodiment

A second example embodiment can be applied in the context of GF NR V2X. In this regard, a second example embodiment will now be described that can applied in the context of a further sensing and resource selection procedure that is described in U.S. patent application Ser. No. 16/746,277 filed Jan. 17, 2020, entitled "METHOD AND APPARATUS FOR SIDELINK TRANMISSION AND RESOURCE ALLOCATION", the contents of which are incorporated herein by reference.

Figure 1:
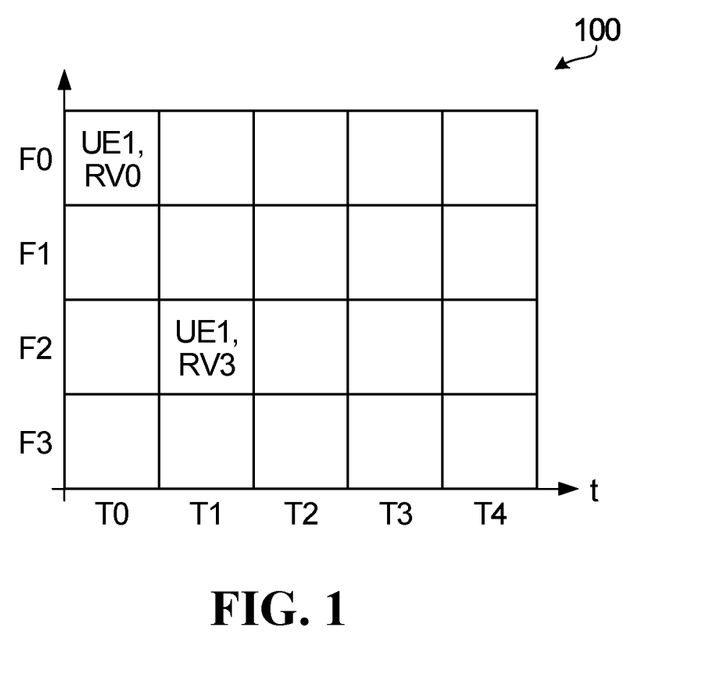
FIG. 1 is a block diagram illustrating an example of a two-dimensional resource configuration for grant-free SL transmission.

FIG. 1 is a block diagram illustrating an example of a two-dimensional resource configuration of candidate resources for grant-free SL transmission. FIG. 1 illustrates a resource grid 100, which includes frequency-domain resources F0, F1, F2 and F3, and time-domain resources T0, T1, T2, T3 and T4. Each combination of frequency-domain resource and time-domain resource forms a transmission resource for SL transmission. FIG. 1 also illustrates a transmission pattern (e.g. a time-frequency resource pattern (TFRP)) for a UE1. For example, resource grid 100 indicates time-frequency communication resources for two transmissions by UE1, as well as a redundancy version (RV) (RV0 or RV3) in a label on each communication resource.

The resource grid 100 has a frequency-domain length of 4 and a time-domain length of 5. In the time-domain, T0 to T4 could be slots, mini-slots, symbols, or any other quantization or unit of time. In the frequency-domain, F0 to F3 could be frequency sub-channels, combinations of sub-channels, resource blocks, resource block groups (RBGs), bandwidth parts (BWPs), subcarriers, a number of subcarriers, carriers or any other quantization or unit of frequency. Different frequency domain sub-channels are just an example. Sub-channels can instead be associated with different layers of non-orthogonal multiple access (NOMA), different pilot resources, and/or other resources. Although shown as time-domain resources and frequency-domain resources in FIG. 1, in general the transmission resources could also or instead include code-domain resources (such as sparse code multiple access), space-domain resources, and/or different demodulation reference signals (DMRS). Moreover, the transmission resources are not limited to two-dimensions, and therefore could include a number of dimensions greater or less than two.

The transmission resources illustrated in FIG. 1 represent communication resources that are potentially available for GF SL transmissions by respective UEs. In general, each transmission resource represents a potential transmission of a transport block (TB). In example embodiments, a UE may use multiple transmission resources based on a selection of one or more pre-configured transmission patterns (e.g. one or more TFRPs). In example embodiments, the same TB is used for each transmission by a UE over the length of a transmission pattern. In FIG. 1, according to its respective transmission patterns, UE1 transmits a TB twice (e.g., RV0 and RV3 of the TB), over the length of the configured transmission pattern, therefore the repetition number, K, of each transmission pattern is 2.

Accordingly, in example embodiments a transmission pattern, (including for example a TFRP) includes one or more transmission resources. In example embodiments, a transmission pattern may be specified as part of parameter set. Each UE may be configured with multiple transmit parameter sets that form a candidate set of transmit parameter sets that the UE can select from for GF SL V2X transmissions. Each transmit parameter set may define: transmission pattern (e.g. time/frequency location), periodicity, frequency sub-channel definition, DMRS/preamble, transmission pattern, SCI location, MCS, repetition number K, HARQ process related parameters, and feedback channel indicator, among other things. In example embodiments, each transmit parameter set is associated with a demodulation reference signal (DMRS) that can be used to determine the other properties of the transmit parameter set, for example the transmit pattern.

Accordingly, in example embodiments, a UE that is monitoring a communication channel can determine, based on DMRSs received in the communication channel, what channel resources (e.g. transmit parameter sets) other UEs are using. In this regard, a DMRS provides an indication of transmission patterns, or more generally, the time frequency resources being used by other UEs for SL data transmissions. A monitoring UE can use the information from the DMRS when choosing its own transmission resources or transmission pattern to avoid or reduce collisions with the detected patterns.

In some example embodiments, an alternative way to indicate the transmission pattern is to indicate it in sidelink control information (SCI) transmitted in a physical sidelink control channel (PSCCH). However, unlike SCI, a DMRS is transmitted in a physical sidelink shared channel (PSSCH) that is also used for TB transmission and thus may incur less overhead.

Accordingly, in example embodiments, a DMRS functions as a type of non-control signal based transmission resource indication signal (NCSBTRIS) that can be used to indicate transmission resources, for example a transmission pattern, for a sidelink transmission. In some embodiments, the NCSBTRIS may be implemented using a reference symbol other than a DMRS. Other specific examples of reference signals that can be used for the NCSBTRIS include sounding reference signal (SRS), channel state information (CSI)-RS. In some examples, the NCSBTRIS is a preamble. In some embodiments, the NCSBTRIS is a synchronization signal. In the above examples, the NCSBTRIS has other purposes, such as purposes related to channel measurement, channel estimation or synchronization but here are also used to implicitly indicate the transmission pattern.

In the following description, the assumption is that the NCSBTRIS is a DMRS, and various options for using the DMRS are provided. It should be understood that these same options apply to the other signals that might be used for the NCSBTRIS, including other reference signals, preambles, and synchronization signals.

In some embodiments, to indicate the transmission pattern, DMRS has a predefined or a configured mapping/association to the pattern. The association/mapping between DMRS or DMRS parameters and the transmission pattern (or transmission pattern index) may be predefined. The association/mapping may also be configured to the UE through signaling (e.g. through RRC signaling, system information or preconfigured to the UE). With the mapping, if a UE detects a DMRS, the UE can then derive which pattern a further UE is using. The mapping that is used to associate DMRS to specific patterns may be based on one or a combination of DMRS sequence, different roots/initialization for the DMRS sequence, different cyclic shift values, DMRS time and frequency locations (e.g. different symbols), different orthogonal cover code used, different antenna ports, different code division multiplexing (CDM) groups, different DMRS patterns, or some other aspect of the DMRS.

Example embodiments of possible DMRS structures include the DMRS used in 3GPP NR uplink described in 3GPP TS 38.211 V15.0.0; UL DMRS used in LTE; and a similar DMRS structure as LTE or NR uplink. DMRS can be generated using a sequence, such as gold sequence (or m-sequence) or Zadoff Chu sequence.

The DMRS parameter may be known by the UE, in which case the UE can detect a DMRS without blind detection. In some case, the exact DMRS parameter may not be known by the UE. In this case, the UE can blindly decode DMRSs to find which DMRSs and which DMRS parameters are used. There is usually a finite choice of DMRS parameters that are known to the UE. An example way to do DMRS detection is to use different choices of potential DMRS sequences to correlate with the DMRS at the potential location of DMRS and find which one gives the highest correlation by finding the output signal with the highest energy. Known sequence detection methods can be applied to perform DMRS detection in example embodiments.

In some examples, DMRS association with a transmission pattern may be achieved through a fixed mapping between a DMRS index and a pattern index. The DMRS index is an index among a pool of DMRSs that can indicate a combination of one or multiple DMRS parameters. The pattern index can be a known pattern among a pattern pool. For example, if there are 20 DMRSs with index p1, p2, . . . , p20 there can be a predefined mapping of p1 to pattern 1, p2 to pattern 2, etc. If there are 40 DMRS with index p1, p2, . . . , p40, there can be a multiple DMRS to one pattern mapping, e.g. p1 and p2 to pattern 1, p3 and p4 to pattern 2, . . . etc.

In some embodiments, the DMRS used to indicate the transmission pattern is transmitted contemporaneously with data transmission. For example, DMRS may be transmitted at the same time or in the same slot as data transmission. In other embodiments, the DMRS that is used to indicate the transmission pattern is transmitted in advance to indicate the transmission pattern. An advance indication signal may be transmitted before the signal transmission occurs, so that a monitoring UE may detect the indication signal and use it to avoid a conflict.

In some embodiments, a specific indication signal window is defined for advanced transmission of a DMRS, followed by a second data transmission window that is available for data transmission using an indicated transmission pattern.

In example embodiments, a UE monitors and detects the DMRS(s) transmitted by other UEs within the indication signal window. Based on the detected DMRS(s), the monitoring UE can determine the transmission patterns being used by the other UEs. Based on the determined transmission patterns used by the other UEs, the monitoring UE can select a transmission pattern based on an objective of avoiding collisions with other UEs' transmission patterns.

Accordingly, in example embodiments, a transmitting UE is configured with a candidate set of transmission patterns for a GF V2X sidelink transmission. Prior to transmitting a TB, the transmitting UE performs a sensing process during which the UE monitors the PSSCH for DMRS transmissions from other UEs. Based on blind detection of DMRS transmissions, the transmitting UE can determine what transmission patterns the other UEs are using for transmission. In example embodiments, the transmitting UE will exclude or remove a transmission pattern from further consideration for transmitting the TB if the transmitting UE determines, based on received DMRS transmissions, that the number of other UEs using transmission pattern is equal to or greater than a threshold L. In example embodiments, the threshold L is at least 2. In example embodiments, excluding or removing a transmission pattern from further consideration includes removing the transmission pattern from the candidate set of transmission patterns.

In some example embodiments, the transmitting UE is also configured to monitor RSRP for signals sent in the PSSCH. In some examples, the RSRP could be measured for the DMRS transmissions. In some embodiments, a transmission pattern is excluded or removed from further consideration if the number of other UEs' DMRS associated with the transmission pattern reaches the threshold L AND the sum of the individual RSRP measurements associated with the same transmission pattern reaches a predetermined power threshold. In another embodiment, a transmission pattern is excluded or removed from further consideration if the number of other UEs' DMRS associated with the transmission pattern for which the measured RSRP is above power threshold is equal to or greater than L.

Third Example Embodiment

Figure 2:
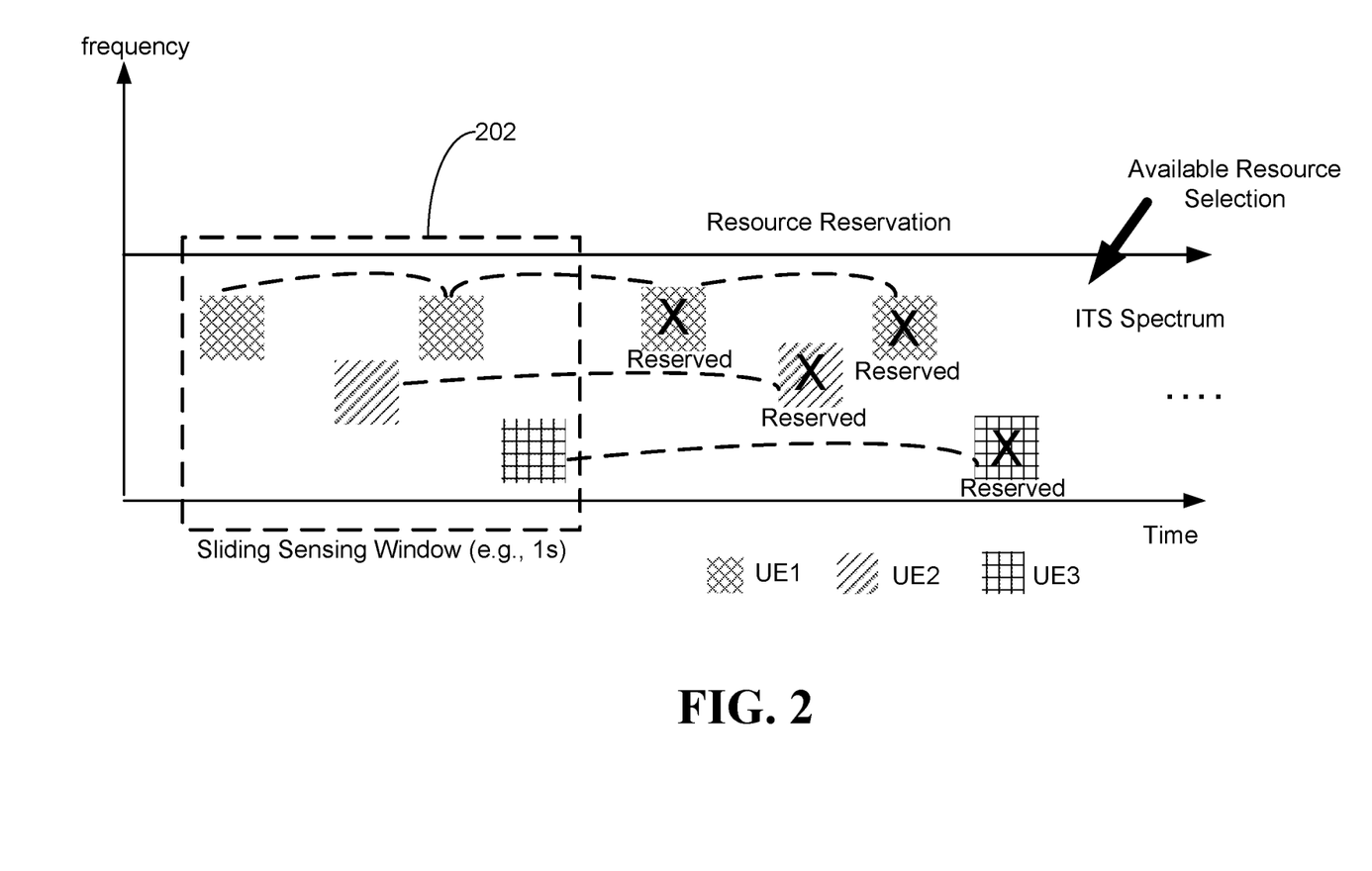
FIG. 2 is a block diagram illustrating a further example of a two-dimensional resource configuration for grant-free SL transmission.

A third example embodiment of SL-V2X resource allocation will now be described. FIG. 2 illustrates an SL communication resource sensing and reservation method in the context of a frequency (y-axis) and time (x-axis) plot. Transmission resources associated with three respective UEs (UE1, UE2 and UE3) are shown as time-frequency blocks within a sliding sensing window 202 and a resource reservation period. In the example embodiment, UEs are synchronized, which enables sensing and resource reservation for V2X traffic. SCI decoding and SL measurement including PSSCH DMRS detection can be used for sensing other UE transmissions. Explicit reservation in SCI or implicit indication via PSCCH/PSSCH DMRS by a transmitting (Tx) UE for a receiving (Rx) UE can indicate the next TB or TBs which can also be used by other UEs for resource selection and exclusion.

Figure 3:
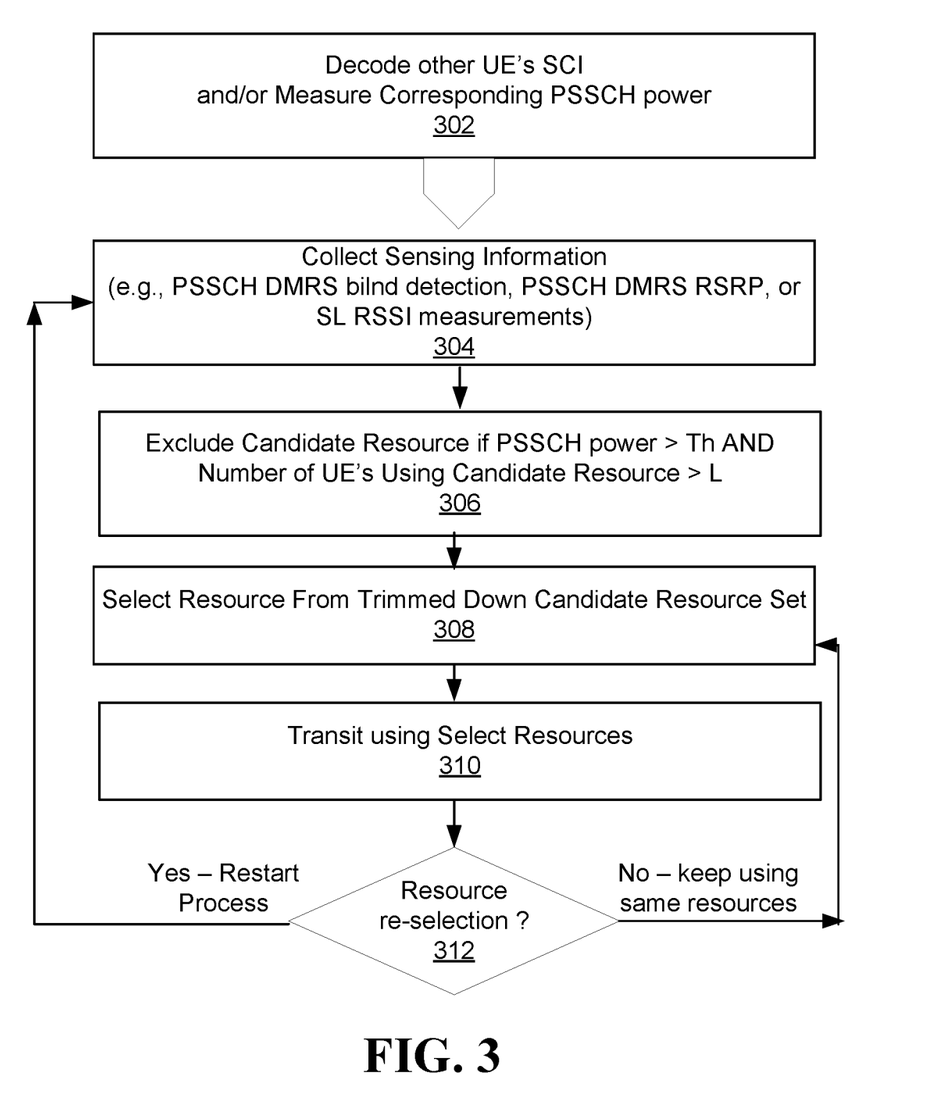
FIG. 3 is a flow diagram illustrating an example of a resource selection method.

FIG. 3 represents a resource selection procedure according to the various example embodiments described above, including a sensing and resource exclusion process.

In example embodiments, UE1 applies a sliding sensing window 202 and collects usage information about a candidate communication resource based on signals received by UE1. Within the sliding sensing window 202, as indicated by block 302, UE1 continuously performs one or more of the following sensing actions to collect usage information: (i) monitors for and decodes the SCIs transmitted from other UEs (e.g. UE2 and UE3 SCIs); (ii) measures PSSCH power or energy corresponding to candidate resources by one or both of: (a) measuring PSSCH DMRS RSRP corresponding to candidate resources, or (b) measuring or energy of an alternative signal (for example, calculate RSSI on a signal other than DMRS in the case where DMRS is not transmitted).

As illustrated in FIG. 3, the sensing and resource exclusion process, includes the following steps:

Step 1: Collect the sensing information (e.g., usage information about usage of the candidate resource) for the current sensing window location (Block 304).

Step 2: Excluding the candidate communication resource from the set of candidate communication resources when the resource usage information exceeds a usage threshold. For example, exclude a candidate resource from a candidate resource set if the sensed power or energy associated with a candidate resource exceeds a threshold (PSSCH power>Th: e.g., RSRP>Th or RSSI>Th) and, the number of other UEs sensed using that candidate resource is larger than a threshold L, where L is at least 2. In example embodiments, the number of UEs may be determined based on number of SCIs decoded from other UEs, or as described in greater detail below, based on a number of blindly detected DMRSs (Block 306).

Step 3: Select a candidate resource from the candidate resources remaining in candidate resource set following the exclusion criterion applied in step 2. In example embodiments, the candidate resource could be randomly selected from the remaining candidates (Block 308).

Step 4: Transmit on the selected resources according to traffic arrival at Tx UE (Block 310).

As per Block 312, in example embodiments, UE1 can re-select a resource, i.e. perform another resource selection according to the above procedure if any of the following triggers occur: transmission opportunities run out; UE consecutively misses a number of transmission opportunities; and the current resource selection cannot meet the latency requirement.

In example embodiments, as an alternative to sensing based on SCI (for example when no SCI is associated with data or when an SCI and its associated data are transmitted in the same slot), the number of other UEs can be based on measuring PSSCH power (e.g., measuring PSSCH DMRS) and used to determine a number of other UEs.

Accordingly, a resource can be excluded if either one of the two conditions are met:

Condition 1 (using SCI): in the case where the candidate resource is explicitly indicated or reserved by decoded SCI: (i) PSSCH power (e.g. RSRP) in the associated PSSCH (data resource) is above a threshold Th and (ii) the number of decoded SCIs from other UEs that reserve the candidate resource is above a threshold is larger than L Condition 2 (No SCI): in the case where the candidate resource is implicitly indicated or reserved by a blindly detected PSSCH DMRS: (i) PSSCH power (e.g. RSRP) in the associated PSSCH (data resource) is above a threshold Th and (ii) and the number of such blindly detected DMRSs is larger than L.

As indicated above, in some examples in block 306 the decision to exclude a particular resource may be based only on the number of other UEs that are detected as explicitly or implicitly reserving the resource.

Figure 4:
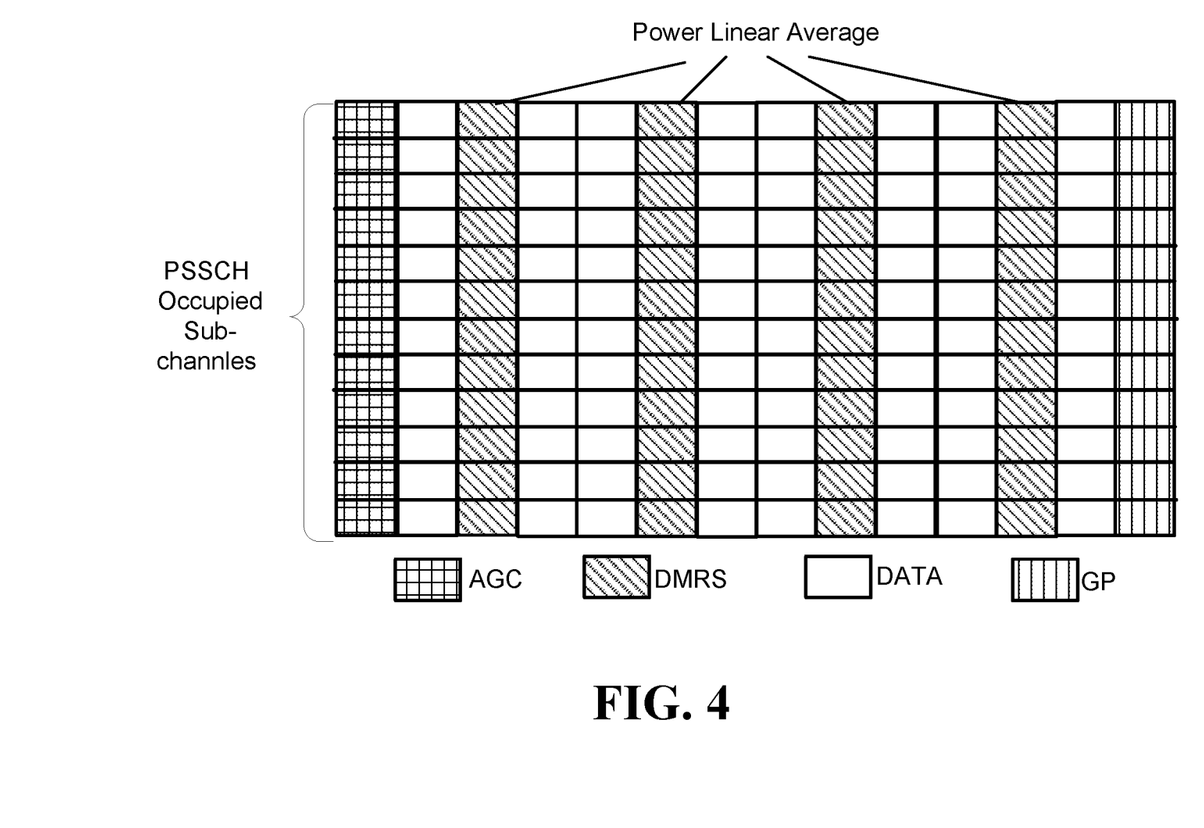
FIG. 4 is a block diagram illustrating physical sidelink shared channel (PSSCH) sub-channels.

Referring to FIG. 4, PSSCH RSRP is defined as the linear average over the power distributions (in [W]) of the resource elements that carry demodulation reference signals associated with PSSCH, within PRBs indicated by the associated PSCCH if there is one or more (pre-)configured (e.g. TFRP).

The RSRP threshold can be a (pre-)configurable function of the priority information that is either carried by SCI or implicitly indicated through PSCCH DMRS. For example in LTE, the RSRP threshold is between [−136, −38] dBm with the granularity of 2 dB including −infinity and +infinity. The threshold can be a function of the priority information of the TBs to be transmitted that is available at the sensing UE and the priority information obtained from the sensing procedure e.g. from SCI decoding or SL measurements or DMRS blind detection.

Apparatus Descriptions

Figure 5:
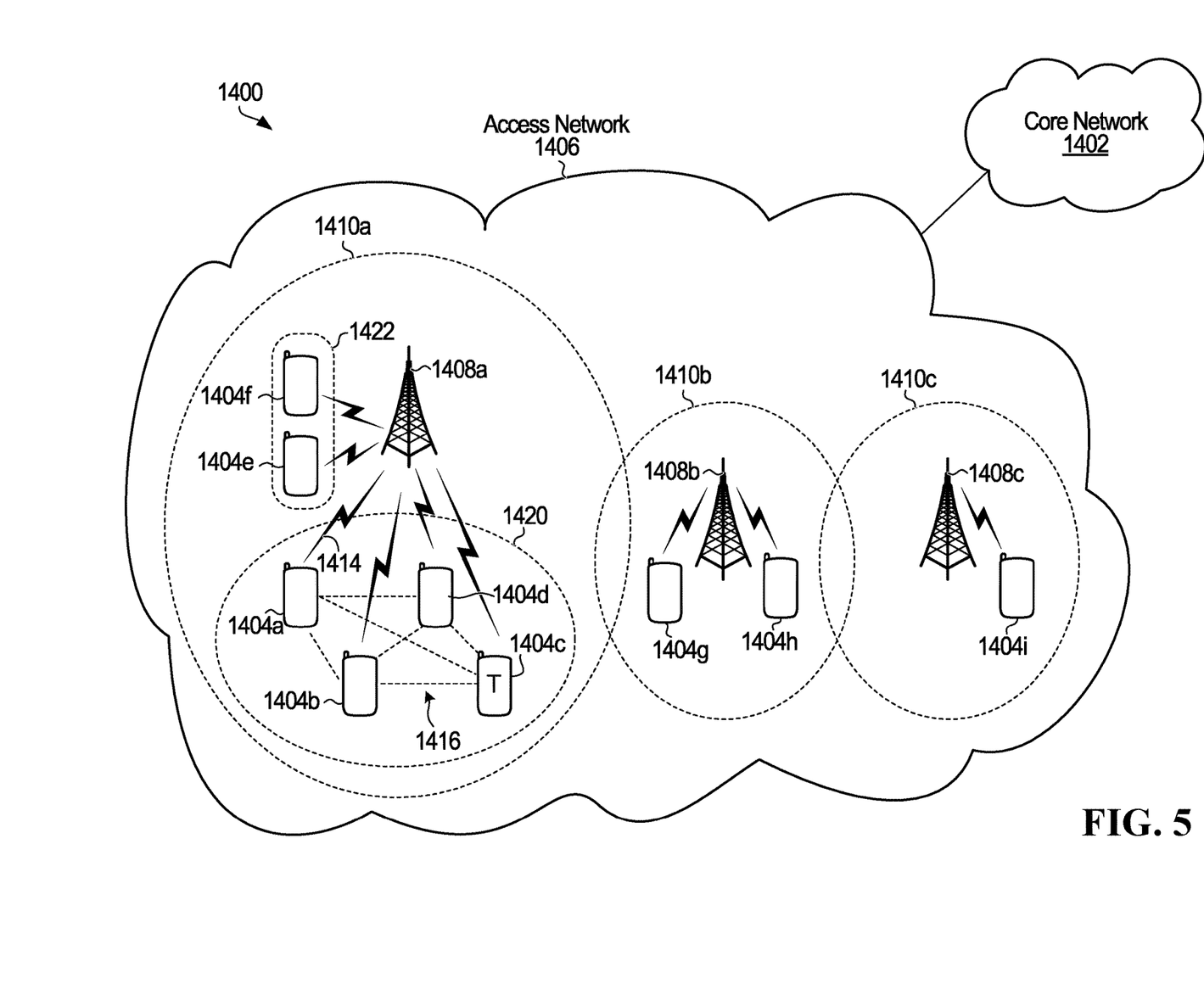
FIG. 5 is a block diagram illustrating an example of a telecommunications network according to one embodiment.

FIG. 5 is a block diagram illustrating an example of a telecommunications network 1400 according to one embodiment, for implementing any one or combination of two or more of the above described methods. The telecommunications network 1400 includes a core network 1402 and an access network 1406. The access network 1406 serves a plurality of UEs 1404a, 1404b, 1404c, 1404d, 1404e, 1404f, 1404g, 1404h, and 1404i. The access network 1406 could be an Evolved Universal Terrestrial Access (E-UTRA) network. As another example, the access network 1406 could be a cloud access network (C-RAN). The access network 1406 includes a plurality of BSs 1408a, 1408b, and 1408c. The BSs 1408a-c each provide a respective wireless coverage area 1410a, 1410b, and 1410c. Each of the BSs 1408a-c could be implemented using a radio transceiver, one or more antennas, and associated processing circuitry, such as antenna radio frequency (RF) circuitry, analog-to-digital/digital-to-analog converters, etc.

Although not illustrated, the BSs 1408a-c are each connected to the core network 1402, either directly or through one or more central processing hubs, such as servers. The BSs 1408a-c could serve as a gateway between the wireline and wireless portion of the access network 1406.

Each one of BSs 1408a-c may instead be referred to as a base transceiver station, a radio BS, a network node, a transmit node, a transmit point, a Node B, an eNode B, or a remote radio head (RRH), depending upon the implementation.

In operation, the plurality of UEs 1404a-i access the telecommunications network 1400 using the access network 1406 by wirelessly communicating with one or more of the BSs 1408a-c.

UEs 1404a-d are in close proximity to each other. The UEs 1404a-d can each wirelessly communicate with the BS 1408a. The UEs 1404a-d can also directly communicate with each other, as represented at 1416. The communications represented at 1416 are direct communications between UEs that do not go through an access network component, such as a BS. As shown in FIG. 2, UE to UE communications 1416 are directly between the UEs 1404a-d and are not routed through the BS 1408a, or any other part of the access network 1406. Communications 1416 may also be referred to as lateral communications. In embodiments disclosed herein, UE to UE communications use an SL channel and an SL air interface. On the other hand, a communication between an access network component, such as BS 1408a, and a UE, as in communication 1414, is called an access communication. An access communication occurs over an access channel, which can be a UL or DL channel, and an access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), 5G New Radio, and WiFi.

By using the SL communications 1416, the UEs 1404a-d may be able to assist with wireless communications between the UEs 1404a-d and the BS 1408a. As one example, if UE 1404c fails to correctly decode a packet received from the BS 1408a, but if UE 1404d is able to receive and correctly decode the packet from the BS 1408a, then UE 1404d could directly transmit the decoded packet to UE 1404c using SL communications 1416. As another example, if UE 1404c moves out of wireless coverage area 1410c, such that UE 1404c can no longer wirelessly communicate with the BS 1408a, then UE 1404b could forward messages between the UE 1404c and the BS 1408a. As another example, UE 1404a and UE 1404c could both receive a signal transmitted from the BS 1408a that carries a packet meant for UE 1404c. UE 1404a may then transmit to UE 1404c, via SL communications 1416, the signal as received by UE 1404a. UE 1404c may then use the information received from UE 1404a to help decode the packet from the BS 1408a. In these examples, capacity and/or coverage may be enhanced through the assistance of UEs 1404a, 1404b, and/or 1404d. V2X communications as referenced herein are an example of SL communications.

The UEs 1404a-d form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group, i.e. address all other UEs within the UE group 1420. The UE group 1420 may form a logical or virtual device mesh in which the members of the UE group 1420 communicate amongst themselves using UE communications over an SL air interface. The UE group 1420 as a whole can act as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408a, then that particular UE is referred to as the target UE (TUE). In the examples above, UE 1404c is being assisted and is therefore a TUE. The other UEs 1404a, 1404b, and 1404d in the group 1420 form a cooperation candidate set, which is a set of UEs that may cooperate to help the TUE 1404c. The subset of UEs in the cooperation candidate set that actually assist the target UE 1404c form a cooperation active set. The cooperation active set may be dynamically selected to assist the target UE 1404c. The UEs in the cooperation active set are referred to as cooperating UEs (CUEs). In UE group 1420, UEs 1404a, 1404b, and 1404d form the cooperation candidate set. If UEs 1404a and 1404b actually assist target UE 1404c, then UEs 1404a and 1404b form the cooperation active set and are the CUEs. As UEs 1404a-d move around, some may leave the UE group 1420 and/or other UEs may join the UE group 1420. Therefore, the cooperation candidate set may change over time, e.g., the cooperation candidate set may change semi-statically. The UE group 1420 may also be terminated by the network 1406, e.g., if the network determines that there is no longer a need or opportunity for the UE group 1420 to provide assistance in wireless communication between the BS 908a and members of the UE group 1420.

There may be more than one UE group. For example, UEs 1404e and 1404f in FIG. 5 form another UE group 1422.

Figure 6:
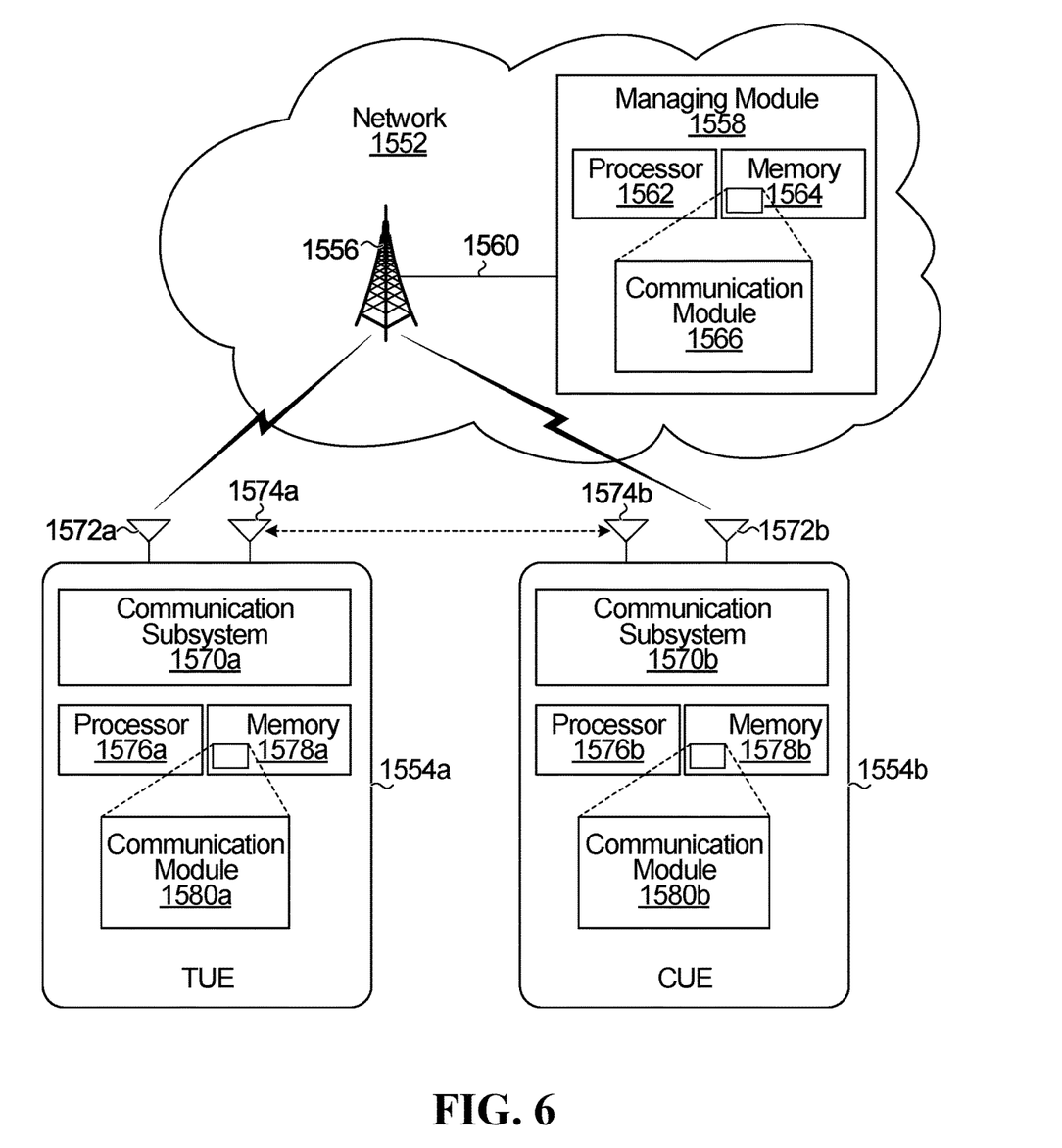
FIG. 6 is a block diagram illustrating an example of a network serving two UEs.

FIG. 6 is a block diagram illustrating an example of a network 1552 serving two UEs 1554a and 1554b, according to one embodiment. The network 1552 may be the access network 1406 from FIG. 5, and the two UEs 1554a and 1554b may be two of the four UEs 1404a-d in FIG. 5. However, more generally this need not be the case, which is why different reference numerals are used in FIG. 6.

The network 1552 includes a BS 1556 and a managing module 1558. The managing module 1558 instructs the BS 856 to perform actions. The managing module 858 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module 1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554a includes a communication subsystem 1570a, two antennas 1572a and 1574a, a processor 1576a, and a memory 1578a. The UE 1554a also includes a communication module 1580a. The communication module 1580a is implemented by the processor 1576a when the processor 1576a accesses and executes a series of instructions stored in the memory 1578a, the instructions defining the actions of the communication module 1580a. When the instructions are executed, the communication module 1580a causes the UE 1554a to perform the actions described herein in relation to establishing and participating in a UE group. Alternatively, the module 1580a may be implemented by dedicated circuitry, such as an ASIC or an FPGA.

The communication subsystem 1570a includes processing and transmit/receive circuitry for sending messages from and receiving messages at the UE 1554a. Although one communication subsystem 1570a is illustrated, the communication subsystem 1570a may be multiple communication subsystems. Antenna 1572a transmits wireless communication signals to, and receives wireless communications signals from, the BS 1556. Antenna 1574a transmits SL communication signals to, and receives SL communication signals from, other UEs, including UE 1554b. In some implementations there may not be two separate antennas 1572a and 1574a. A single antenna may be used. Alternatively, there may be several antennas, but not separated into antennas dedicated only to SL communication and antennas dedicated only to communicating with the BS 1556.

SL communications could be over Wi-Fi, in which case the antenna 1574a may be a Wi-Fi antenna. Alternatively, the SL communications could be over Bluetooth™, in which case the antenna 1574a may be a Bluetooth™ antenna. SL communications could also or instead be over licensed or unlicensed spectrum.

The UE 1554b includes the same components described above with respect to the UE 1554a. That is, UE 1554b includes communication subsystem 1570b, antennas 1572b and 1574b, processor 1576b, memory 1578b, and communication module 1580b.

The UE 1554a is designated as a target UE (TUE) and will therefore be called TUE 1554a. The UE 1554b is a cooperating UE and will therefore be called CUE 254b. The CUE 1554b may be able to assist with wireless communications between the BS 1556 and TUE 1554a if a UE group were to be established that included TUE 1554a and CUE 1554b. Other communication scenarios are also contemplated, in a V2X application, for example.

UE 1554a may be specifically chosen as the target UE by the network 1552. Alternatively, the UE 1554a may itself determine that it wants to be a target UE and inform the network 1552 by sending a message to the BS 1556. Example reasons why UE 1554a may choose or be selected by the network 1552 to be a target UE include: low wireless channel quality between the UE 1554a and the BS 1556, many packets to be communicated between the BS 1556 and the UE 1554a, and/or the presence of a cooperating UE that is a good candidate for helping with communications between the BS 1556 and the UE 1554a.

UE 1554a need not always stay a target UE. For example, UE 1554a may lose its status as a target UE once there is no longer a need or desire for assistance with wireless communications between UE 1554a and the BS 1556. UE 1554a may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 1554a acts only as a target UE, i.e., TUE 1554a, and the UE 1554b is a cooperating UE to the TUE 1554a, i.e., CUE 1554b.

FIGS. 5 and 6 illustrate systems in which embodiments could be implemented. In some embodiments, a UE includes a processor, such as 1576a, 1576b in FIG. 6, and a non-transitory computer readable storage medium, such as 1578a, 1578b in FIG. 6, storing programming for execution by the processor. A non-transitory computer readable storage medium could also or instead be provided separately, as a computer program product.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
   determining, by a first user equipment device (UE), resource usage information about usage of a first communication resource by second UEs based on signals received by the first UE, wherein the resource usage information includes a number of the second UEs using the first communication resource;
   excluding the first communication resource from a set of candidate communication resources based at least on the number of the second UEs using the first communication resource of the resource usage information exceeding a threshold number of the second UEs of a usage threshold, the threshold number being at least two; and
   selecting, by the first UE, when the first communication resource is excluded, a second communication resource from remaining candidate communication resources remaining in the set of candidate communication resources to use for a transmission by the first UE.

2. The method of claim 1, wherein the first communication resource corresponds to a communication channel, the determining the resource usage information further comprising:
   measuring received signal power for the communication channel, wherein the usage threshold is also based on the received signal power measured by the first UE exceeding a threshold received signal power, wherein the first communication resource is excluded from the set of candidate communication resources when the number of the second UEs using the first communication resource exceeds the threshold number of the second UEs and the received signal power measured by the first UE exceeds the threshold received signal power.

3. The method of claim 2, wherein the received signal power is measured in respect of reference signals transmitted by the second UEs.

4. The method of claim 3, wherein the communication channel is a physical sidelink shared channel (PSSCH), and the reference signals are demodulation reference signals (DMRS).

5. The method of claim 1, wherein determining the number of the second UEs using the first communication resource comprises determining a number of control signals, received by the first UE over a control channel, from the second UEs that indicate the first communication resource.

6. The method of claim 5, wherein the control channel is a physical sidelink control channel (PSCCH) and the control signals are sidelink control information (SCI).

7. The method of claim 1, wherein determining the number of the second UEs using the first communication resource comprises determining a number of reference signals, received by the first UE over a data channel, from the second UEs that indicate the first communication resource.

8. The method of claim 7, wherein the data channel is a physical sidelink shared channel (PSSCH), the first communication resource and the second communication resource define respective resources for the PSSCH, and the reference signals are demodulation reference signals (DMRSs).

9. The method of claim 1, wherein the first communication resource is excluded from the set of candidate communication resources when the number of the second UEs using the first communication resource exceeds the threshold number of the second UEs.

10. A first user equipment (UE) comprising:
at least one processor; and
a memory coupled to the at least one processor and storing instructions, that when executed by the at least one processor, cause the first UE to:
  determine resource usage information about usage of a first communication resource by second UEs based on signals received by the first UE, wherein the resource usage information includes a number of the second UEs using the first communication resource;
  exclude the first communication resource from a set of candidate communication resources based at least on the number of the second UEs using the first communication resource of the resource usage information exceeding a threshold number of the second UEs of a usage threshold, the threshold number being at least two; and
  select, when the first communication resource is excluded, a second communication resource from remaining candidate communication resources remaining in the set of candidate communication resources to use for a transmission by the first UE.

11. The first UE of claim 10, wherein the first communication resource corresponds to a communication channel, and wherein the instructions further cause the first UE to:
  measure, as part of the resource usage information, received signal power for the communication channel; and
  exclude the first communication resource from the set of candidate communication resources when the number of the second UEs using the first communication resource exceeds the threshold number of the second UEs and the received signal power measured by the first UE exceeds a threshold received signal power.

12. The first UE claim 11, wherein the received signal power is measured in respect of a plurality of reference signals transmitted by the second UEs.

13. The first UE of claim 12, wherein the communication channel is a physical sidelink shared channel (PSSCH), and the reference signals are demodulation reference signals (DMRS).

14. The first UE of claim 10, wherein the number of the second UEs using the first communication resource is determined by: determining a number of control signals, received by the first UE over a control channel, from the second UEs that indicate the first communication resource.

15. The first UE of claim 14, wherein the control channel is a physical sidelink control channel (PSCCH) and the control signals are sidelink control information (SCI).

16. The first UE of claim 10, wherein the number of the second UEs using the first communication resource is determined by: determining a number of reference signals, received by the first UE over a data channel, from the second UEs that indicate the first communication resource.

17. The first UE of claim 16, wherein the data channel is a physical sidelink shared channel (PSSCH), the first communication resource defines a resource for the PSSCH, and the reference signals are demodulation reference signals (DMRSs).

18. A non-transitory computer-readable medium having instructions stored thereon that, when executed by a first user equipment device (UE), cause the first UE to perform operations, the operations comprising:
  determining resource usage information about usage of a first communication resource by second UEs based on signals received by the first UE, wherein the resource usage information includes a number of the second UEs using the first communication resource;
  excluding the first communication resource from a set of candidate communication resources based at least on the number of the second UEs using the first communication resource of the resource usage information exceeding a threshold number of the second UEs of a usage threshold, the threshold number being at least two; and
  selecting when the first communication resource is excluded, a second communication resource from remaining candidate communication resources remaining in the set of candidate communication resources to use for a transmission by the first UE.

* * * * *